(12) United States Patent
Fregene et al.

(10) Patent No.: US 7,769,474 B2
(45) Date of Patent: Aug. 3, 2010

(54) METHOD FOR SOFT-COMPUTING SUPERVISION OF DYNAMICAL PROCESSES WITH MULTIPLE CONTROL OBJECTIVES

(75) Inventors: Kingsley O. C. Fregene, Andover, MN (US); Ranjana Ghosh, Minneapolis, MN (US); Nitin Lamba, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 707 days.

(21) Appl. No.: 11/231,341

(22) Filed: Sep. 20, 2005

(65) Prior Publication Data

US 2007/0067050 A1  Mar. 22, 2007

(51) Int. Cl.
- G05B 15/02 (2006.01)
- G05B 19/18 (2006.01)
- G05B 11/01 (2006.01)
- G06F 19/00 (2006.01)
- B64C 13/04 (2006.01)
- H01S 4/00 (2006.01)

(52) U.S. Cl. ............... 700/9; 244/234; 455/899; 700/3; 700/19; 701/33

(58) Field of Classification Search ............ 700/9, 700/3, 919; 706/2, 36; 244/234; 455/899; 701/33; 709/9
See application file for complete search history.

(56) References Cited

U.S. PATENT DOCUMENTS 1,726,131 A  8/1929  Wensley et al.
1,745,071 A  1/1930  Wensley
1,871,762 A  8/1932  White
4,910,684 A  3/1990  Ostergaard et al.
5,006,992 A  4/1991  Skeirik
5,122,957 A  6/1992  Hattori
5,161,110 A  11/1992  Dorchak
5,191,636 A * 3/1993  Halperin ............... 706/23
5,204,939 A  4/1993  Yamazaki et al.
5,295,061 A  3/1994  Katayama et al.

(Continued)

FOREIGN PATENT DOCUMENTS

EP        1264221        12/2002

(Continued)

OTHER PUBLICATIONS

Karim et al., "Experiences with the Design and Implementation of an Agent-based Autonomous UAV Controller" Jul. 2005 ACM, pp. 19-26.*

(Continued)

*Primary Examiner*—Ramesh B Patel
*Assistant Examiner*—Thomas H Stevens
(74) *Attorney, Agent, or Firm*—Fogg & Pow (57) ABSTRACT

A method to supervise a local dynamical system having multiple preset control objectives and operating in conjunction with other dynamical systems. The method includes receiving state input from dynamical systems in an environment at a distributed soft computing level, generating weights and applying the weights to the preset control objectives using soft computing methods to form weighted control objectives. The weights are computed based on the received state input. The method also includes generating a command signal for the local dynamical system based on the weighted control objectives and transmitting the command signal to a controller in the local dynamical system.

20 Claims, 9 Drawing Sheets

U.S. PATENT DOCUMENTS

| | | | |
|---|---|---|---|
| 5,377,308 A * | 12/1994 | Inoue et al. ............. 706/52 |
| 5,390,004 A | 2/1995 | Hopkins |
| 5,408,588 A * | 4/1995 | Ulug ............. 706/25 |
| 5,440,672 A | 8/1995 | Araki et al. |
| 5,517,424 A | 5/1996 | Marcelle et al. |
| 5,602,964 A * | 2/1997 | Barrett ............. 706/25 |
| 5,633,987 A | 5/1997 | Teng et al. |
| 5,649,062 A | 7/1997 | Teng et al. |
| 5,760,812 A | 6/1998 | Hopkins |
| 5,806,052 A | 9/1998 | Bonissone et al. |
| 5,822,740 A | 10/1998 | Haissig et al. |
| 5,892,190 A | 4/1999 | Morita et al. |
| 5,895,458 A | 4/1999 | Nishidai et al. |
| 6,055,524 A | 4/2000 | Cheng |
| 6,098,011 A | 8/2000 | Scott |
| 6,125,314 A | 9/2000 | Graf et al. |
| 6,192,354 B1 * | 2/2001 | Bigus et al. ............. 706/46 |
| 6,216,083 B1 * | 4/2001 | Ulyanov et al. ............. 701/106 |
| 6,326,758 B1 | 12/2001 | Discenzo |
| 6,377,878 B1 | 4/2002 | Feddema et al. |
| 6,434,435 B1 | 8/2002 | Tubel et al. |
| 6,442,535 B1 | 8/2002 | Yifan |
| 6,446,054 B1 * | 9/2002 | Mayorga Lopez ............. 706/2 |
| 6,459,938 B1 | 10/2002 | Ito et al. |
| 6,473,851 B1 | 10/2002 | Plutowski |
| 6,526,323 B1 | 2/2003 | Miyajima et al. |
| 6,601,107 B1 | 7/2003 | Seibert |
| 6,609,060 B2 * | 8/2003 | Ulyanov et al. ............. 701/106 |
| 6,615,087 B2 | 9/2003 | Kanai |
| 6,665,651 B2 | 12/2003 | Young et al. |
| 6,701,236 B2 | 3/2004 | Ulyanov et al. |
| 6,768,927 B2 | 7/2004 | Krogmann |
| 6,780,322 B1 | 8/2004 | Bissler et al. |
| 6,816,802 B2 | 11/2004 | Kim et al. |
| 7,085,637 B2 * | 8/2006 | Breed et al. ............. 701/38 |
| 2002/0103512 A1 | 8/2002 | Echauz et al. |
| 2002/0177912 A1 | 11/2002 | Sobiski |
| 2003/0110148 A1 | 6/2003 | Ulyanov et al. |
| 2003/0144746 A1 | 7/2003 | Hsiung et al. |
| 2003/0158587 A1 | 8/2003 | Esteller et al. |
| 2004/0019409 A1 | 1/2004 | Kelly et al. |
| 2004/0024750 A1 | 2/2004 | Ulyanov et al. |
| 2004/0030420 A1 | 2/2004 | Ulyanov et al. |
| 2004/0039555 A1 | 2/2004 | Ulyanov et al. |
| 2004/0107013 A1 | 6/2004 | Fuller et al. |
| 2004/0238693 A1 | 12/2004 | Cole |
| 2004/0262991 A1 | 12/2004 | Anwar |

FOREIGN PATENT DOCUMENTS

| | | |
|---|---|---|
| JP | 63102434 | 5/1988 |
| JP | 1094401 | 4/1989 |
| JP | 2000305918 | 11/2000 |
| WO | 0169329 | 9/2001 |

OTHER PUBLICATIONS

Rawashdeh et al., "A UAV Test Development Environment Based on Dynamic System Reconfiguration", May 2005 ACM pp. 1-7.*

Alzbutas et al., "Dynamic Systems Simulation Using APL2" 1999 ACM pp. 20-25.*

Willis et al., "An Open Platform for Econfigurable Control" 2001 IEEE p. 49-64.*

Guler et al., "Transition Management for Reconfigurable Hybrid Control Systems" 2003, IEEE, p. 36-40.*

"Adaptive Control", 2003, pp. 1-40, no title listed but accepted.

Taylor, "Algorithm Design, User Interface, and Optimization Procedure for a Fuzzy Logic Ramp Metering Algorithm: A Training Manua", "Technical Report for the Washington State Transportation Commission", Feb. 2000, pp. 1-103, Published in: Seattle, WA.

Yager, "Analysis of Flexible Structured Fuzzy Logic Controllers", "IEEE Transactions on Systems, Man, and Cybernetics", Jul. 1994, pp. 1035-1043, vol. 24, No. 7, Publisher: IEEE.

Anderson et al., "Formation Flight as a Cooperative Game", "AIAA Gudance Navigation and Control Conference", 1998, pp. 244-251, Publisher: AIAA.

Sozio, "Intelligent Parameter Adaptation for Chemical Processes" Jul. 8, 1999, p. 85, Published in: Blacksburg, Virginia.

Arslan, "Multi-Model Control of Nonlinear Systems Using Closed-Loop Gap Metric", Sep. 19, 2003, 5 pages.

Tomescu et al., "Neuro-Fuzzy Multi-Model Control Using Sugeno Inference and Kohonen Tuning in Parameter Space", "IEEE Conference in Systems Man and Cybernetics", 1997, pp. 1028-1032, Publisher: IEEE, Published in: New York, NY.

Baer, "Tutorial on Fuzzy Logic Applications in Power Systems", "Tutorial on Fuzzy Logic Applications in Power Systems Prepared for the IEEE-PES Winter Meeting in Singapore Jan. 2000", pp. 3-7, Publisher: IEEE, Published in: New York, NY.

* cited by examiner

METHOD FOR SOFT-COMPUTING SUPERVISION OF DYNAMICAL PROCESSES WITH MULTIPLE CONTROL OBJECTIVES

TECHNICAL FIELD

The present invention relates to supervision of dynamical systems, in particular the supervision of dynamical systems by using soft-computing techniques.

BACKGROUND

Dynamical systems that operate in conjunction with one another and have at least one shared control often benefit from supervision that includes all the control objectives of all the dynamical systems. In some cases, the control objectives of the dynamical systems conflict with each other. In other cases, at least one dynamical system has internally conflicting control objectives. In other cases, the control objectives of the dynamical systems conflict with each other and some dynamical systems have internally conflicting control objectives. For example, a team of unmanned aerial vehicles (UAVs) flying in formation are dynamical systems that share a common control objective to reach a destination at a particular time and with a specific spatial configuration. Additionally, each UAV has unique internal control objectives relating to maintaining their position within the formation. An UAV experiences an internal conflict if an external object is impeding the programmed route and the UAV has to move out of formation to avoid a collision.

Existing hybrid control design methods and multi-model control design methods for such dynamical systems use fixed algorithms to switch from one control law or model to another law or model. The switching logic required to switch laws or models is unwieldy and sometimes leads to undesirable results, particularly if there are a large number of control objectives to manage.

Under conventional hard discrete control laws, a dynamical system may be instructed to switch modes too often in too short a time interval. In some cases, the hard discrete control law switching causes the dynamical system to "chatter" and even become mechanically unstable. For example, an exemplary UAV subjected to conflicting control objectives is instructed to turn left in one instant, stop in the next instant, turn left in the following instant, as so forth with a resultant jerky movement. Additionally, the dynamical system can trigger false alarms when the modes switch too often. Hybrid control design methods and multi-model control design methods do not learn from the dynamical systems in order to evolve the control laws or models over time. Thus, if the hybrid control design methods and/or multi-model control design methods produce system instability for a given system condition, the design methods will again produce the system instability when the given system conditions reoccur.

Other control design methods employ weighted combinations of multiple control objectives using fixed weight prioritization or simplistic closed form expression for each weighting. These control design methods are difficult to develop and often do not adequately capture (or respond to) the prevailing system conditions. These control designs methods do not learn from the dynamical systems to evolve over time.

For the reasons stated above, there is a need to control dynamical systems while avoiding the problems typically associated with hard discrete control law switching of the dynamical systems.

SUMMARY OF INVENTION

The above mentioned problems of current systems are addressed by embodiments of the present invention and will be understood by reading and studying the following specification.

A first aspect of the present invention provides a method to supervise a local dynamical system having multiple preset control objectives and operating in conjunction with other dynamical systems. The method includes receiving state input from dynamical systems in an environment at a distributed soft computing level. The method also includes applying the weights to the preset control objectives using soft computing methods to form weighted control objectives. The weights are generated based on the received state input. The method also includes generating a command signal for the local dynamical system based on the weighted control objectives and transmitting the command signal to a controller in the local dynamical system.

A second aspect of the present invention provides a system to reduce the mode switching of a dynamical system. The system includes a local dynamical system at a dynamical system level, a local intelligence system at a distributed soft computing level, and other dynamical systems at the dynamical system level. The distributed soft computing level is higher than the dynamical system level. The local intelligence system is in communication with the local dynamical system and the other dynamical systems are in communication with respective other intelligence systems at the distributed soft computing level. The local intelligence system generates a command signal specific for the local dynamical system.

A third aspect of the present invention provides a computer readable medium storing a computer program. The medium includes computer readable medium storing a computer program including computer readable code to receive state input from dynamical systems in an environment at a distributed soft computing level, computer readable code in a soft computing methodology to generate weights and apply the weights to preset control objectives to form weighted control objectives. The medium generates the weights based on the received state input. The medium also includes computer readable code to generate a command signal for the local dynamical system based on the weighted control objectives and computer readable code to transmit the command signal from the distributed soft computing level to the local dynamical system.

A fourth aspect of the present invention provides local dynamical system including means for receiving a state input from other dynamical systems sharing an environment, means for determining a priority for objectives of the dynamical system based on the received state input, and means for receiving a command signal based on the determined priority.

BRIEF DESCRIPTION OF DRAWINGS

The present invention can be more easily understood and further advantages and uses thereof more readily apparent, when considered in view of the description of the embodiments and the following figures, in which like references indicate similar elements, and in which.

DETAILED DESCRIPTION

In the following detailed description, reference is made to the accompanying drawings, which form a part hereof, and in which is shown by way of illustration specific embodiments in which the invention may be practiced. These embodiments are described in sufficient detail to enable those skilled in the art to practice the invention. The following detailed description is not to be taken in any limiting sense and the scope of the present invention is defined only by the claims and equivalents thereof.

Figure 1:
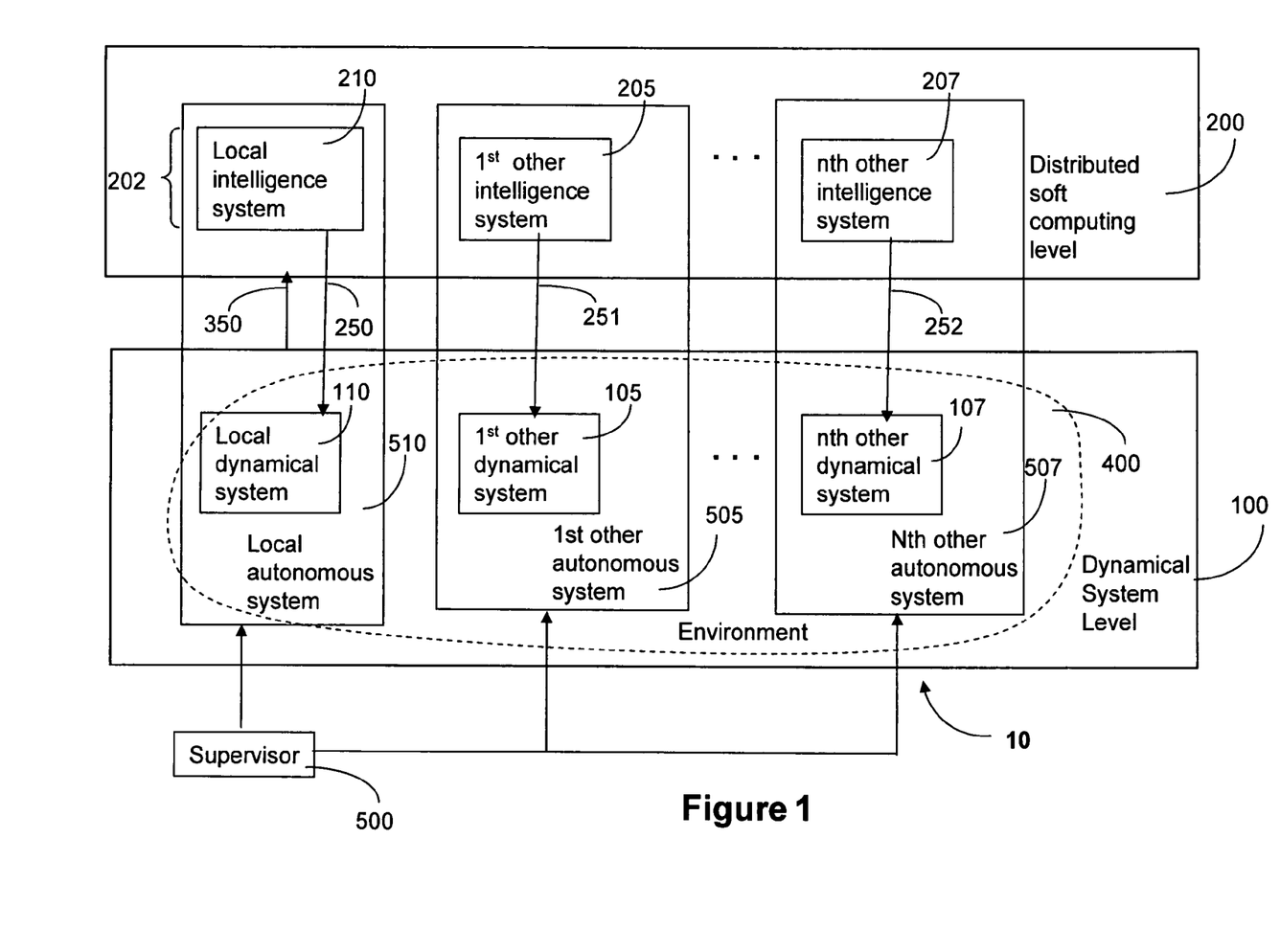
FIG. 1 is a box diagram of a first embodiment of a system having two levels to supervise a local dynamical system in accordance with the present invention.

FIG. 1 is a box diagram of a first embodiment of a system 10 having two levels 100 and 200 to supervise a local dynamical system 110 in accordance with the present invention. Specifically, system 10 includes a dynamical system level 100 and a distributed soft computing level 200. Local dynamical system 110 and "n" other dynamical systems are represented by first other dynamical system 105 and $n^{th}$ other dynamical system 107 where "n" is a positive integer. First other dynamical system 105 and $n^{th}$ other dynamical system 107 are on the dynamical system level 100.

For purposes of this specification, a dynamical system is a plant or hardware structure with an integrated feedback control system. The feedback received by the dynamical system is internal and external. The system is dynamic since the feedback is continually updated and the hardware is operable to change one or more hardware functions and/or parameters in immediate response to the feedback. Sensors within the dynamical system provide a portion of the data for the system feedback. The states of the dynamical system are modified according to operational signals from a controller in the dynamical system.

In one embodiment, the combination of the intelligent system and dynamical system (FIG. 1) make up an autonomous agent which is supervised by an external supervisor 500. The controller (FIG. 5) in the dynamical system is operable to cause the dynamical system to obey command signals generated by the intelligent system. The input from the supervisor 500 may be in the form of preset control objectives for a system mission. In one embodiment, the autonomous agent is operable to transmit input to the supervisor 500 as part of a higher level system feedback. The communication between the supervisor 500 and the autonomous agent is provided by a wireless communication system, optical communication system, electrical circuit or combinations thereof. The technologies for wireless communication systems, optical communication systems, and electrical circuits are known in the art. In one embodiment, the supervisor 500 transmits data to the autonomous agent system on a portable software medium. For example the preset control objectives for a system mission can be copied onto a compact disc, a smart card, or a floppy disc which is then inserted into a receiving port in the agent system and downloaded to its on-board computational devices.

In an exemplary dynamical system for an aerospace application, UAVs with internal controllers are the dynamical systems and the external supervisor generates the guidance commands for the UAVs. In this case, the preset control objectives provided by the guidance system include the destination of a formation of the UAVs and the positions of the UAVs with respect to each other. In one embodiment of this exemplary case, one or more of the UAVs transmit input to the supervisory guidance system as part of a system feedback to indicate when the UAVs reach the destination.

The distributed soft computing level 200 includes the distributed intelligence system 202. The distributed intelligence system 202 includes a local intelligence system 210, and "n" other intelligence systems, which are represented by the first up to and including the $n^{th}$ other intelligence systems 205 and 207. The intelligence systems contain one or more soft computing algorithms and are physically distributed in location in system 10.

The distributed intelligence system 202 in system 10 is physically distributed in a plurality of "n+1" autonomous systems. Local autonomous system 510 includes local dynamical system 110 co-located with local intelligence system 210. First other autonomous system 505 includes first other dynamical system 105 co-located with first other intelligence system 205. The $n^{th}$ other autonomous system 507 includes $n^{th}$ other dynamical system 107 co-located with the $n^{th}$ other intelligence system 207.

A dynamical system is defined as one of the other dynamical systems 105 and 107 if the dynamical system shares the same environment 400 with the local dynamical system 110. An environment 400 in which the local dynamical system 110 and the other dynamical systems 105 and 107 are located is indicated by a dashed line surrounding the dynamical system level 100. The other dynamical systems 105 and 107 are similar in structure and function to the local dynamical system 110. Details about the structure and function of the local dynamical system 110 are described below with reference to FIG. 5.

The distributed soft computing level 200 is operable to receive a state input 350. The state input includes the current status of the local dynamical system 110, the current status of other dynamical systems 105 up to and including 107 as well as the current status of the environment 400. In an aerospace context, the state input 350 can include translational positions and velocities of the local dynamical system 110 and other dynamical systems 105 up to and including 107, the direction of motion of the local dynamical system 110, rotational positions and velocities of the systems 110, 105 and 107, and other states of the local dynamical system 110 and other dynamical systems 105 up to and including 107. The state input 350 can also include the temperature, humidity and/or wind speed of the environment 400.

The local intelligence system 210 generates weights for the preset control objectives of local dynamical system 110, using soft computing methods and applies these weighted control objective as commands to the said dynamical system. The weights are computed by reasoning on the received state input 350. The local intelligence system 210 generates a command signal 250 for the local dynamical system 110 based on the weighted control objectives and transmits the command signal 250 to a controller 120 (FIG. 5) in the local dynamical system 110. Details about the structure and function of one embodiment of the local intelligence system 210 in the distributed soft computing level 200 are described below with reference to FIG. 9. Details about the structure and function of one embodiment of the local dynamical system 210 are described below with reference to FIG. 5.

The other dynamical systems 205 and 207 are similar in structure and function to the local dynamical system 210. Thus, the 1$^{st}$ other intelligence system 205 generates the command signals 251 that are transmitted to the controller in the dynamical system 105. Likewise, the nth other intelligence system 207 generates the command signals 252 that are transmitted to the controller in the nth other dynamical system 107.

The distributed soft computing level 200 is at a higher level than the dynamical system level 100 since the distributed soft computing level 200 receives input from more than one remotely located dynamical system. Additionally, the intelligence system 210 in the distributed soft computing level 200 is programmed to recognize which control objectives of the local dynamical system 110 are shared high-level mission goals with the other dynamical systems 105 to 107.

Soft computing is based on methods that generate robust and tractable solutions from imprecise and uncertain inputs. Soft computing methods emulate the ambiguity and uncertainty in human thinking and reasoning. Like humans, soft computing methods are capable of "learning" in that they can modify their algorithms and rule sets based on the inputs and outputs over time.

Fuzzy logic, fuzzy inference schemes, neural networks, evolutionary computation schemes, neural networks with on-line training, simulated annealing schemes, genetic algorithms and randomized heuristical algorithms are the core methodologies of soft computing.

Fuzzy logic, neural networks, genetic algorithms and, in some cases, hard computing methods are used in combination to form a synergistic, complementary distributed soft computing platform. The term distributed soft computing, as used herein, means that the inputs, such as state input 350, are processed according to the intelligence of the soft computing platform and are subjected to one or more of the soft computing methodologies of the software platform, which is distributed within a plurality of autonomous systems, such as local autonomous system 110, first other autonomous system 105 and n$^{th}$ other autonomous system 107.

In particular, the distributed soft computing level 200 comprises one or more soft computing schemes including one or more of fuzzy logic, fuzzy inference schemes, neural networks, evolutionary computation schemes, neural networks with on-line training, simulated annealing schemes, genetic algorithms and randomized heuristical algorithms which analyze and/or reason on the input for each of the autonomous dynamical systems 510, 505 and 507 (FIG. 1), autonomous dynamical systems 610, 605 and 607 (FIG. 3) or semi-autonomous dynamical systems 110, 105 and 107 (FIGS. 2 and 4) that include a soft computing based supervisor 212.

A dynamical system is semi-autonomous if the distributed soft computing level and/or the information coordination level is not included within or at the dynamical system. In one embodiment, the distributed soft computing levels and/or the information coordination levels corresponding to respective semi-autonomous dynamical systems are co-located at a location external to all the semi-autonomous dynamical systems. In one embodiment of this case, the distributed soft computing levels and/or the information coordination levels are located in the guidance system for the semi-autonomous dynamical systems.

Figure 2:
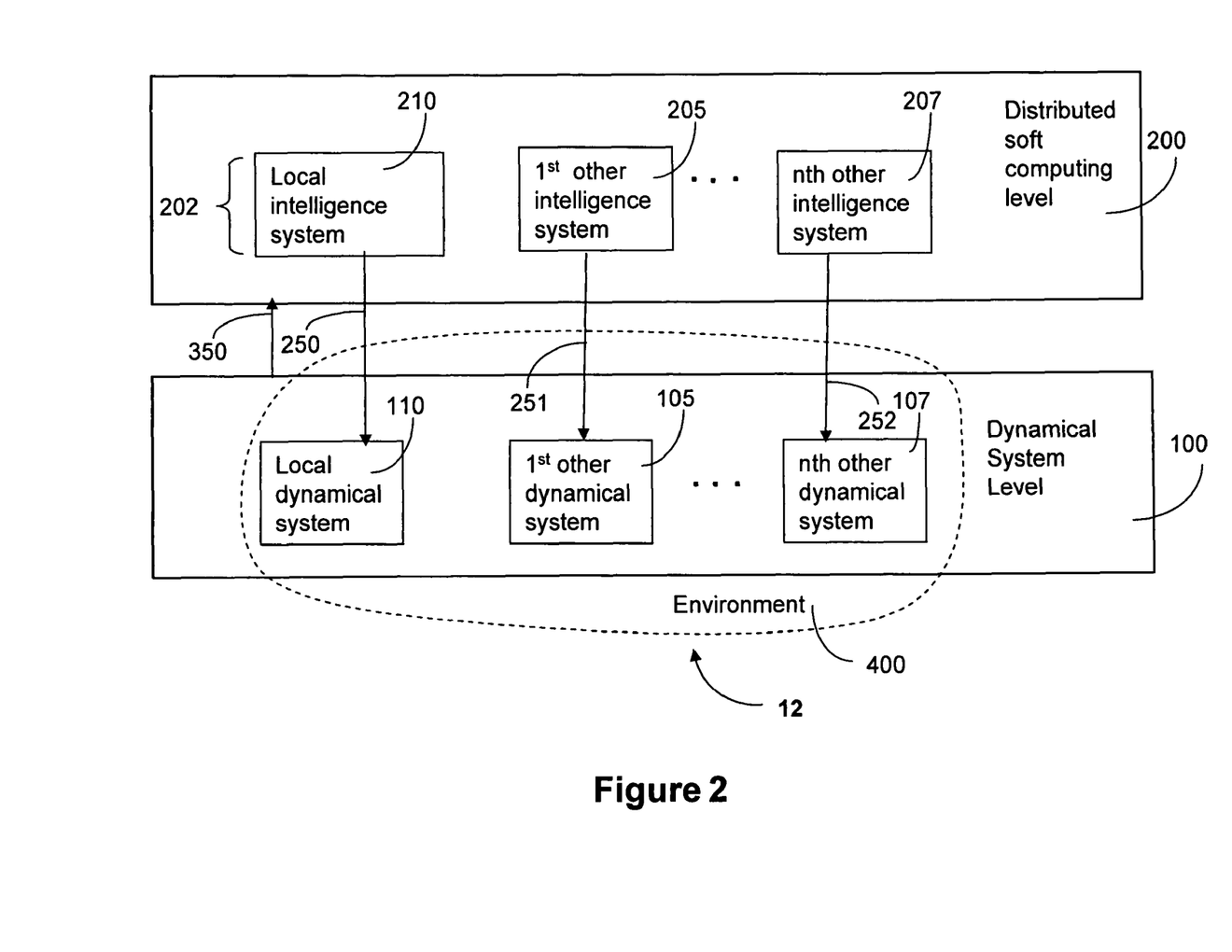
FIG. 2 is a box diagram of a second embodiment of a system having two levels to supervise a local dynamical system in accordance with the present invention.

FIG. 2 is a box diagram of a second embodiment of a system 12 having two levels 100 and 200 to supervise a local dynamical system 110 in accordance with the present invention. System 12 includes the dynamical system level 100 and the distributed soft computing level 200 as described above with reference to FIG. 1. The supervisor 500 is not shown in FIG. 2, but is operable as described above for FIG. 1.

System 12 differs from system 10 described above with reference to FIG. 1, in that the distributed intelligence system 202 is not physically located in a plurality of autonomous systems. The local intelligence system 210 is remotely located from the local dynamical system 110. First other intelligence system 205 is remotely located from first other dynamical system 105 and n$^{th}$ other intelligence system 207 is remotely located from n$^{th}$ other dynamical system 207. In system 12, the local dynamical system 110 and the other dynamical systems 105 and 107 are semi-autonomous dynamical systems. All the intelligence systems 205, 207 and 210 in the distributed intelligence system 202 are located in a single location. In another embodiment, the intelligence systems 205, 207 and 210 in the distributed intelligence system 202 are located in more than one location external to the dynamical systems 105, 107 and 110.

The function of system 12 is similar to the function of system 10 in that, the distributed soft computing level 200 is operable to received a state input 350 regarding a current status of the local dynamical system 110, the other dynamical systems 105 and 107 and the environment 400. The distributed soft computing level 200 is programmed to recognize which control objectives of the local dynamical system 110 are shared high-level mission goals with the other dynamical systems 105 and 107.

Figure 3:
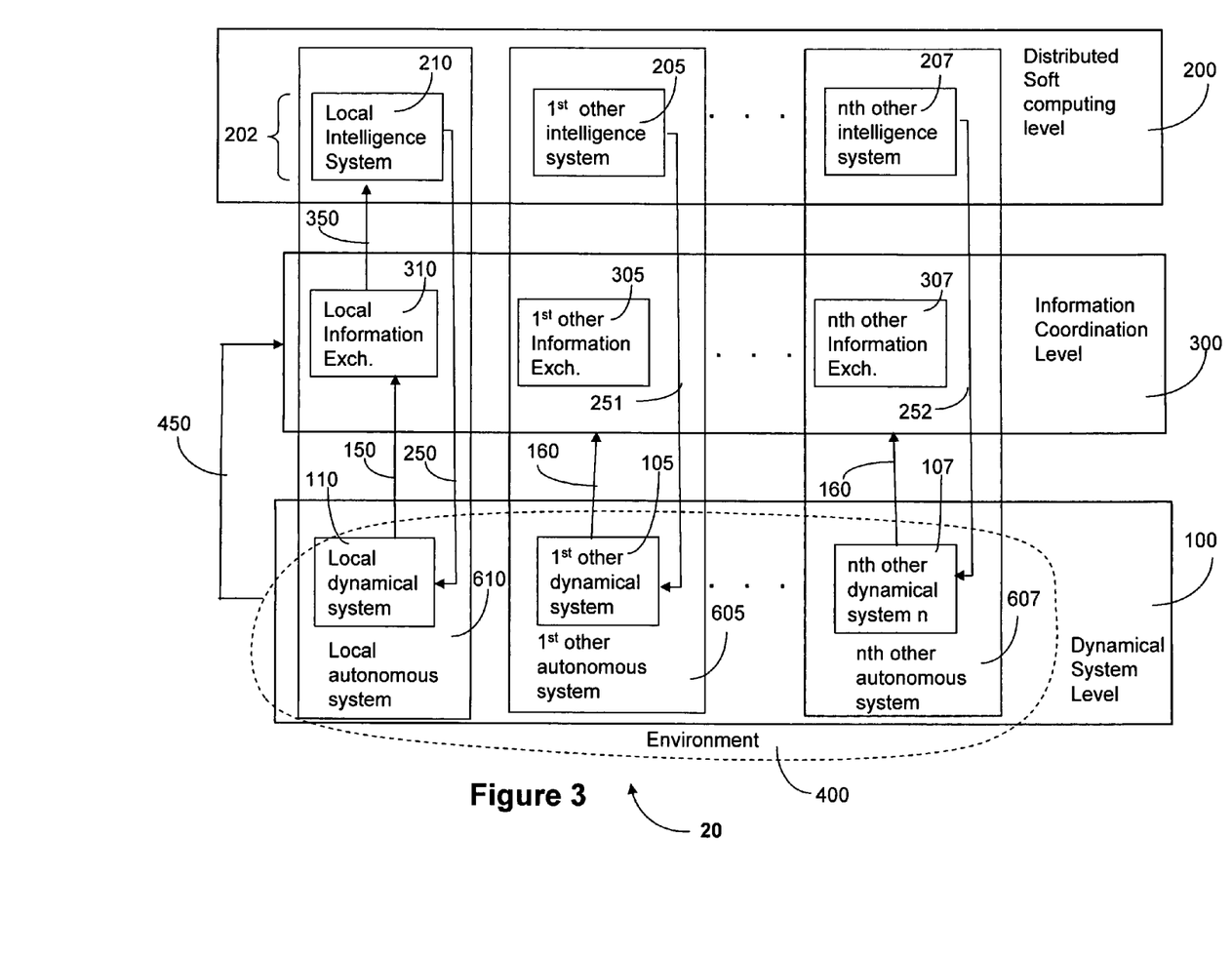
FIG. 3 is a box diagram of a first embodiment of a system having three levels to supervise a local dynamical system in accordance with the present invention.

FIG. 3 is a box diagram of a first embodiment of a system 20 having three levels 100, 200 and 300 to supervise a local dynamical system 110 in accordance with the present invention.

Specifically, system 20 includes a dynamical system level 100, a distributed soft computing level 200 and an information coordination level 300. As described above with reference to FIG. 1, local dynamical system 110 and the other dynamical systems 105 up to and including 107 are on the dynamical system level 100. The distributed soft computing level 200 includes the distributed intelligence system 202. The distributed intelligence system 202 is distributed between a local intelligence system 210, and "n" other intelligence systems, which are represented by the first up to n$^{th}$ other intelligence systems 205 and 207.

The information coordination level 300 includes the local information exchanger 310 and "n" other information exchangers. The plurality of information exchangers are represented by the first information exchanger 305 up to the n$^{th}$ information exchanger 307.

The information coordination level 300 is physically located in a plurality of autonomous systems 610, 605 and 607. The distributed intelligence system 202 in system 20 is respectively located in the same plurality of autonomous systems 610, 605 and 607. Local autonomous system 610 includes local dynamical system 110 and local information exchanger 310 both co-located with local intelligence system 210. First other autonomous system 605 includes first other dynamical system 105 and first other information exchanger 305 both co-located with first other intelligence system 205. The n$^{th}$ other autonomous system 607 includes n$^{th}$ other dynamical system 107 and n$^{th}$ other information exchanger 307 both co-located with the n$^{th}$ other intelligence system 207.

The information coordination level 300 receives local state input 150 from the local dynamical system 110 at the local information exchanger 310. Local state input 150 defines the state of the local dynamical system 110. The state can include the velocity of the local dynamical system 110, the direction of movement of the local dynamical system 110, a rotation state of the local dynamical system 110, and other states of the local dynamical system 110. The information coordination level 300 receives other-system state input 160 from other dynamical systems 105 and 107.

The other-system state input 160 defines the state of the other dynamical systems 105 and 107 in the environment 400. The other-system state input 160 includes the velocity of the other dynamical systems 105 and 107, the direction of movement of the other dynamical systems 105 and 107, a rotation state of the other dynamical systems 105 and 107, and other states of the other dynamical systems 105 and 107. The information coordination level 300 receives external environment input 450 at the information coordination level 300 from an environment 400 of the local dynamical system 110. The external environment input 450 includes the temperature of the environment 400, the humidity of the environment 400, the wind in the environment 400, position of any obstacles in the environment 400 and other environmental parameters.

The information coordination level 300 aggregates the state input 350 and transmits it to the distributed soft computing level 200.

The information coordination level 300 acts as a clearing house for state input and sensory input from the local dynamical system 110, the other dynamical systems 105 and 107 and the environment 400. Thus, since input is being received from all the dynamical systems 110, 105 and 107, the information coordination level 300 is a higher level than the dynamical system level 100. Each of the intelligence systems 210, 205 and 207 in the distributed intelligence system 202 receives state input from the information coordination level 300. Specifically, the local information exchanger 310 transmits the state input 350 related to local dynamical system 110 to local intelligence system 210. The first other information exchanger 305 transmits the state input related to the first other dynamical system 105 to other intelligence system 205. Likewise, the nth other information exchanger 307 transmits the state input related to the nth other dynamical system 107 to local intelligence system 207. Thus, the distributed soft computing level 200 is a higher level than the information coordination level 300 and the information coordination level 300 is a higher level than the dynamical system level 100.

In one embodiment of system 20, the information coordination level 300 is internal to the distributed soft computing level 200.

Figure 4:
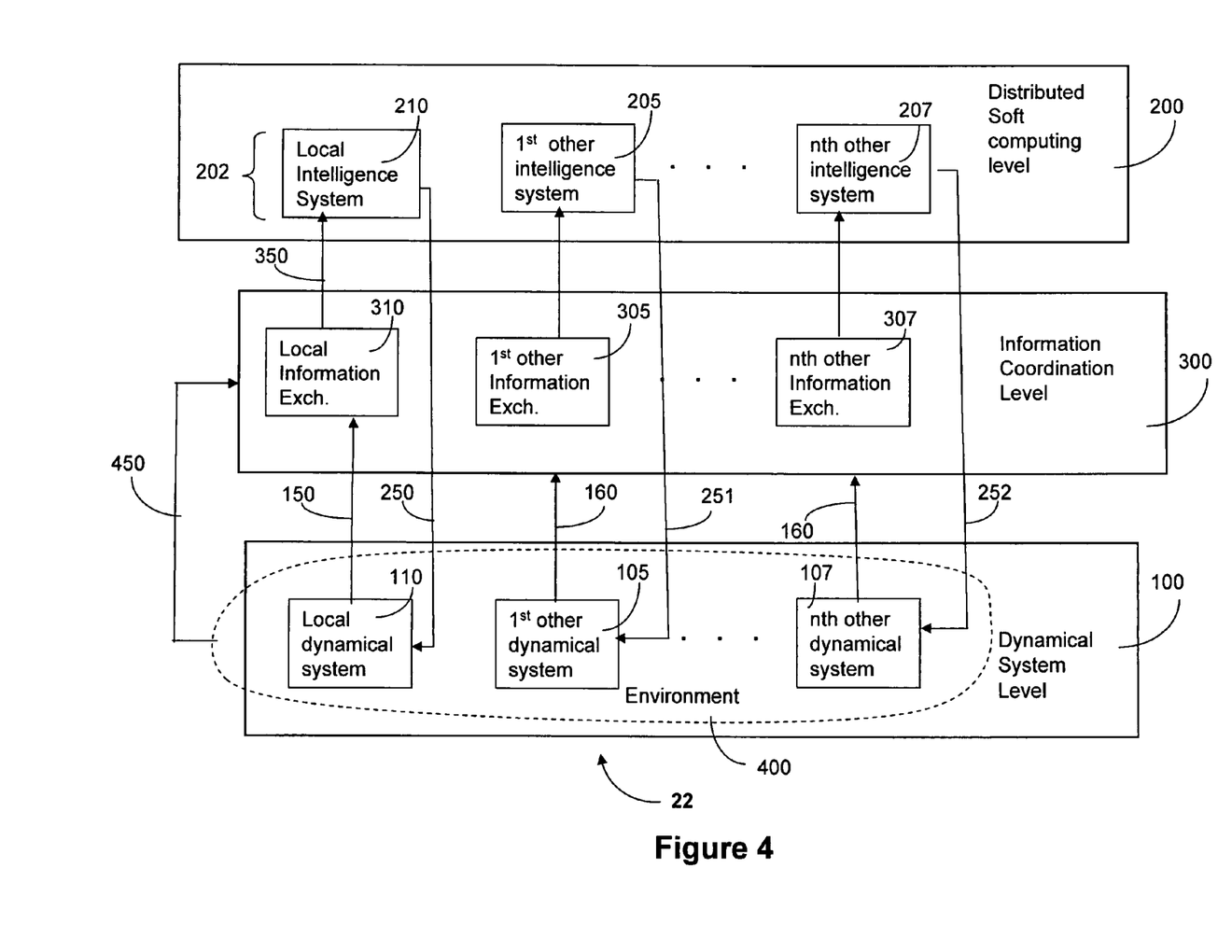
FIG. 4 is a box diagram of a second embodiment of a system having three levels to supervise a local dynamical system in accordance with the present invention.

FIG. 4 is a box diagram of a second embodiment of a system 22 having three levels 100, 200 and 300 to supervise a local dynamical system 110 in accordance with the present invention. As described above with reference to FIG. 3, local dynamical system 110 and the other dynamical systems 105 and 107 are on the dynamical system level 100, the distributed soft computing level 200 includes the distributed intelligence system 202 and the information coordination level 300 includes the local information exchanger 310 and a plurality of other information exchangers 305 and 307. The distributed intelligence system 202 is distributed between a local intelligence system 210, and all the other intelligence systems, which are represented by the first other intelligence system 205 and the $n^{th}$ other intelligence system 207.

In one embodiment, the information exchangers 310, 305, and 307 on the information coordination level 300 are physically located in a plurality of semi-autonomous dynamical systems that include the local dynamical system 110, and the other dynamical systems 105 and 107, while the distributed intelligence system 202 in system 22 is not physically located with the dynamical systems 110, 105 and 107. In another embodiment, the information exchangers 310, 305, and 307 of the information coordination level 300 and the intelligence systems 210, 205 and 207 of the distributed intelligence system 202 are not physically located with the dynamical systems 110, 105 and 107 of the dynamical system level 100. In this embodiment, the local dynamical system 110 and the first other dynamical system 105 and $n^{th}$ other dynamical system 107 are each semi-autonomous systems.

The information coordination level 300 receives local state input 150 from the local dynamical system 110. The information coordination level 300 receives other-system state input 160 from the first other dynamical system 105 and $n^{th}$ other dynamical system 107 at the local information exchanger 310. The information coordination level 300 receives external environment input 450 from an environment 400 of the local dynamical system 110 at the local information exchanger 310.

If the information exchangers 305-310 and the respective dynamical systems 105-110 are not co-located, the local state input 150, the other-system state input 160, and the external environment input 450 are wirelessly transmitted from the local dynamical system 110, the first other dynamical system 105 and $n^{th}$ other dynamical system 107, and the environment 400 to the information coordination level 300, respectively. The technology for wireless communication systems are known in the art.

If the information exchangers 305-310 and the dynamical systems 105-110 are co-located, the local state input 150 the other-system state input 160 and 107 the external environment input 450 are transmitted to the information coordination level 300 by wireless communication systems, optical communication systems, electrical circuits or combinations thereof. The technologies for wireless communication systems, optical communication systems, and electrical circuits are known in the art.

If the intelligence systems 205-210 and the information exchangers 305-310 are co-located, the state input 350 is transmitted from the information coordination level 300 to the distributed soft computing level 200 by wireless communication systems, optical communication systems, electrical circuits or combinations thereof.

If the intelligence systems 205-210 and the information exchangers 305-310 are not co-located, the state input 350 is transmitted from the information coordination level 300 to the to the distributed soft computing level 200 by wireless transmission.

In one embodiment of system 22, the information coordination level 300 is internal to the distributed soft computing level 200. In another embodiment of system 22, the information coordination level 300 is internal to the dynamical system level 100.

Regarding FIGS. 1-4, the other dynamical systems 105-107 are similar in structure and function to the local dynamical system 110. The local dynamical system 110 functions as one of the other dynamical systems for each of the other dynamical systems 105-109 in the environment 400.

Figure 5:
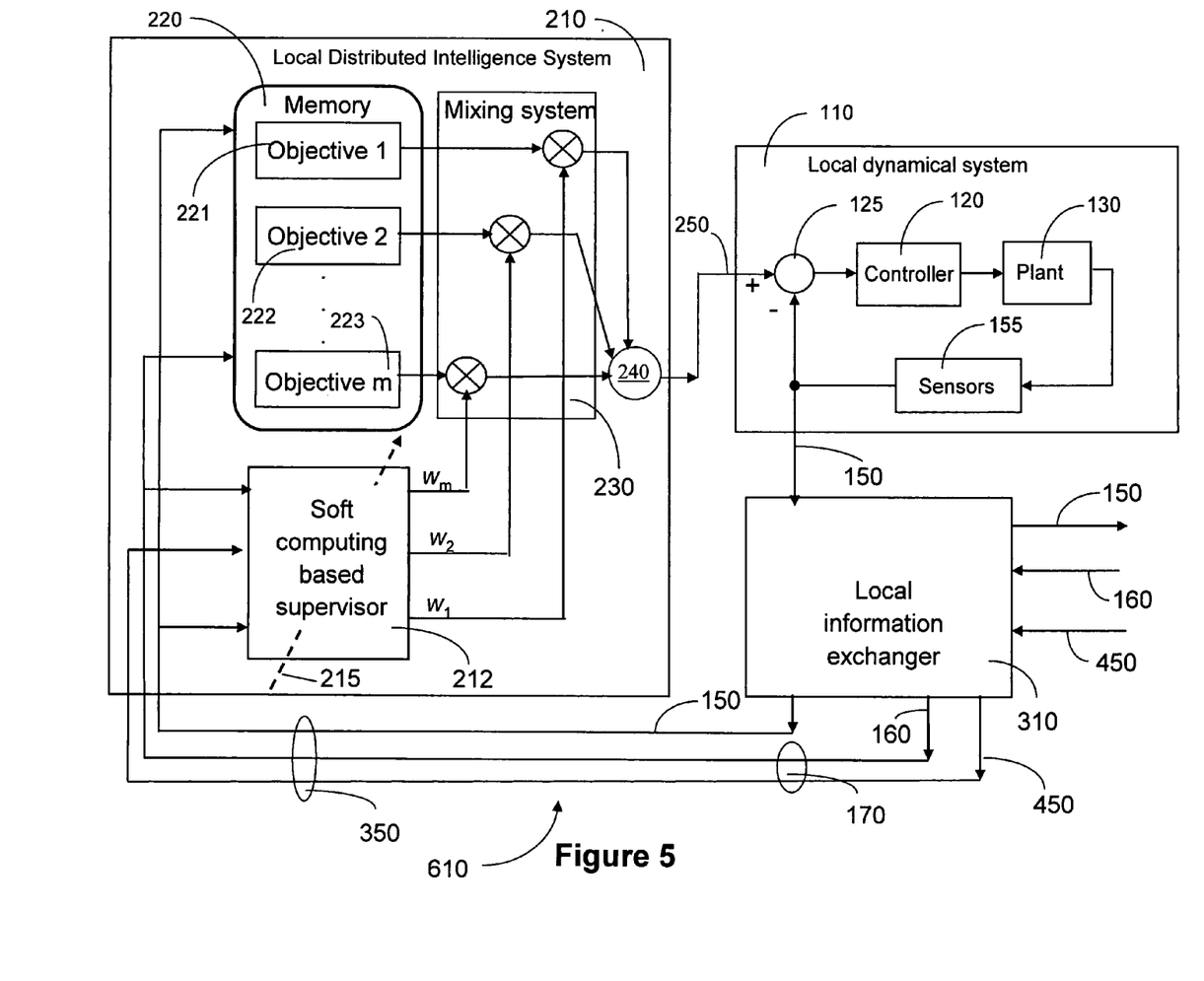
FIG. 5 is a box diagram of the communication within the local dynamical system of the system of FIG. 3 in accordance with an embodiment of the present invention.

FIG. 5 is a box diagram of the communication within the local autonomous system 610 of the system 20 of FIG. 3 in accordance with an embodiment of the present invention. The local autonomous system 610 includes the local dynamical system 110, local information exchanger 310, and the local intelligence system 210.

The local information exchanger 310 receives the local state input 150 from the local dynamical system 110. The local information exchanger 310 receives the external environment input 450 from sensors in the environment 400. The local information exchanger 310 also receives the other-system state input 160 from all the other dynamical systems in the environment 400. The local information exchanger 310 transmits the local state input 150 received from the local dynamical system 110 to all the other dynamical systems in the environment 400. The local information exchanger 310 includes transceivers (not shown) to perform the receiving and transmitting and at least one processor (not shown) to combine the external environment input 450 and the other-system state input 160 as the other state input 170.

The local information exchanger 310 transmits the other state input 170 and the local state input 150 to the soft computing based supervisor 212 in the local intelligence system 210. The local information exchanger 310 also transmits the other-system state input 160 and the local system input 150 to the memory 220 in the local intelligence system 210 to provide a prioritization at the memory 220 of the control objectives 221-223.

The local intelligence system 210 includes a soft computing based supervisor 212 receiving the state input 350 and outputting weights $W_1$-$W_m$, and a memory 220 storing the "m" control objectives 221-223 of the local dynamical system 110, where "m" is a positive integer equal to the number of control objectives for the local dynamical system 110. The local intelligence system 210 also includes a mixing system 230 to apply dynamically determined weights $W_1$-$W_m$ to the respective control objectives 221-223 and a summation processor 240 to generate the specific command signals 250 that are transmitted to the controller 120 in the local dynamical system 110 via transceiver 125 in the local dynamical system 110.

Likewise, the local intelligence system 205 includes a mixing system to apply dynamically determined weights $W_1$-$W_{m'}$ to the respective m' control objectives 221-223 to generate the specific command signals 251 (FIG. 3) that are transmitted to the controller in the dynamical system 105.

The local intelligence system 207 also includes a mixing system to apply dynamically determined weights $W_1$-$W_{m''}$ to the respective m'' control objectives and generates the specific command signals 252 (FIG. 3) that are transmitted to the controller in the local dynamical system 107.

The soft computing based supervisor 212 is programmed with soft computing methodologies as described above with reference to FIG. 1. The soft computing based supervisor 212 is operable to optionally modify its inference system (e.g. rules bases) in the distributed soft computing level 200 based on the received state input 350 and the results of applying prior weighted control objectives to individual dynamical systems. When a set of intelligent reasoning algorithms is modified based on the state input 350, the soft computing based supervisor 212 is learning according to the soft computing methodology. This learning capability of the soft computing based supervisor 212 is indicated by the dashed arrow 215, which crosses the soft computing based supervisor 212. The soft computing schemes treat the preset control objectives 221-223 stored in the memory 220 as specific commands. In one embodiment, the soft computing based supervisor 212 also includes hard computing methodologies.

The memory 220 outputs a control objective 221 which is mixed in the mixing system 230 with the weighting factor $W_1$ that is output from the soft computing based supervisor 212. The memory 220 outputs a control objective 222 which is mixed in the mixing system 230 with the weighting factor $W_2$ that is output from the soft computing based supervisor 212. The memory 220 also outputs a control objective 223 which is mixed in the mixing system 230 with the weighting factor $W_3$ that is output from the soft computing based supervisor 212.

The mixing system 230 outputs the mixed weighted control objectives to the summation processor 240, which generates a command signal 250. The command signal 250 is a target value for a selected state of the local dynamical system 110. The selected state can be a velocity, a direction of movement, a speed, a rotation, and other states of the local dynamical system 110.

The command signal 250 is transmitted to the local dynamical system 110 as described above with reference to FIG. 3. As the local dynamical system 110, the first other intelligence system 205 and the $n^{th}$ other intelligence system 207 and the environment 400 change, the command signal 250 is operable to initiate a change of the state in the local dynamical system 110. The priority of the multiple preset control objectives 221-223 are shifted as the inputs to the local information exchanger 310 change.

The local dynamical system 110 includes a controller 120 operable to initiate an action for the local dynamical system 110 based on the command signal 250 received from the local intelligence system 210. The local dynamical system 110 also includes a plant 130 operable to be modified according to the initiated action, sensors 155 to sense selected states and a transceiver 150 to transmit the sensed selected states and to receive the command signal 250. The plant 130 is the hardware of the local dynamical system 110. In one embodiment, the sensor 155 senses the external environment 400 (FIG. 3) of the local dynamical system 110. For example, sensor 155 senses the temperature, humidity, wind speed and wind direction of the external environment 400.

The sensors 150 input data to the controller 120 via the transceiver 125 and to the local information exchanger 310. The controller 120 receives the command signal 250 from the transceiver 125, forms an instruction signal for the plant 130 based on the sensed data from sensors 155 and the command signal 250. The controller 120 transmits the instruction signal to the plant 130 which responds to the instruction signal. The response by the plant 130 alters the state of the local dynamical system 110. Thus, the supervision of the local dynamical system 110 is provided by the local intelligence system 210 to the controller 120 of the local dynamical system 110 in the local autonomous system 610.

In the exemplary case of local autonomous system 610, the local information exchanger 310, the local intelligence system 210 and the local dynamical system 110 are collocated with the hardware of the plant 130.

The communications among the local information exchanger 310, the local intelligence system 210 and the local dynamical system 110 are provided by short range wireless technology, optical communication systems, electrical circuits or combinations thereof.

The communications within the local information exchanger 310, the local intelligence system 210 and the local dynamical system 110 are provided by short range wireless technology, optical communication systems, electrical circuits or combinations thereof.

In the exemplary case of a semi-autonomous system as described above with reference to FIG. 4, the local information exchanger 310, the local intelligence system 210 and the local dynamical system 110 are not co-located. In that case, the communications among the local information exchanger 310, the local intelligence system 210 and the local dynamical system 110 are provided by short range wireless technology or long range wireless technology depending on the distance between the systems in question, as known in the art. The communication within the local information exchanger 310, the local intelligence system 210 and the local dynamical system 110 are provided by short range wireless technology, optical communication systems, electrical circuits or combinations thereof.

Figure 6:
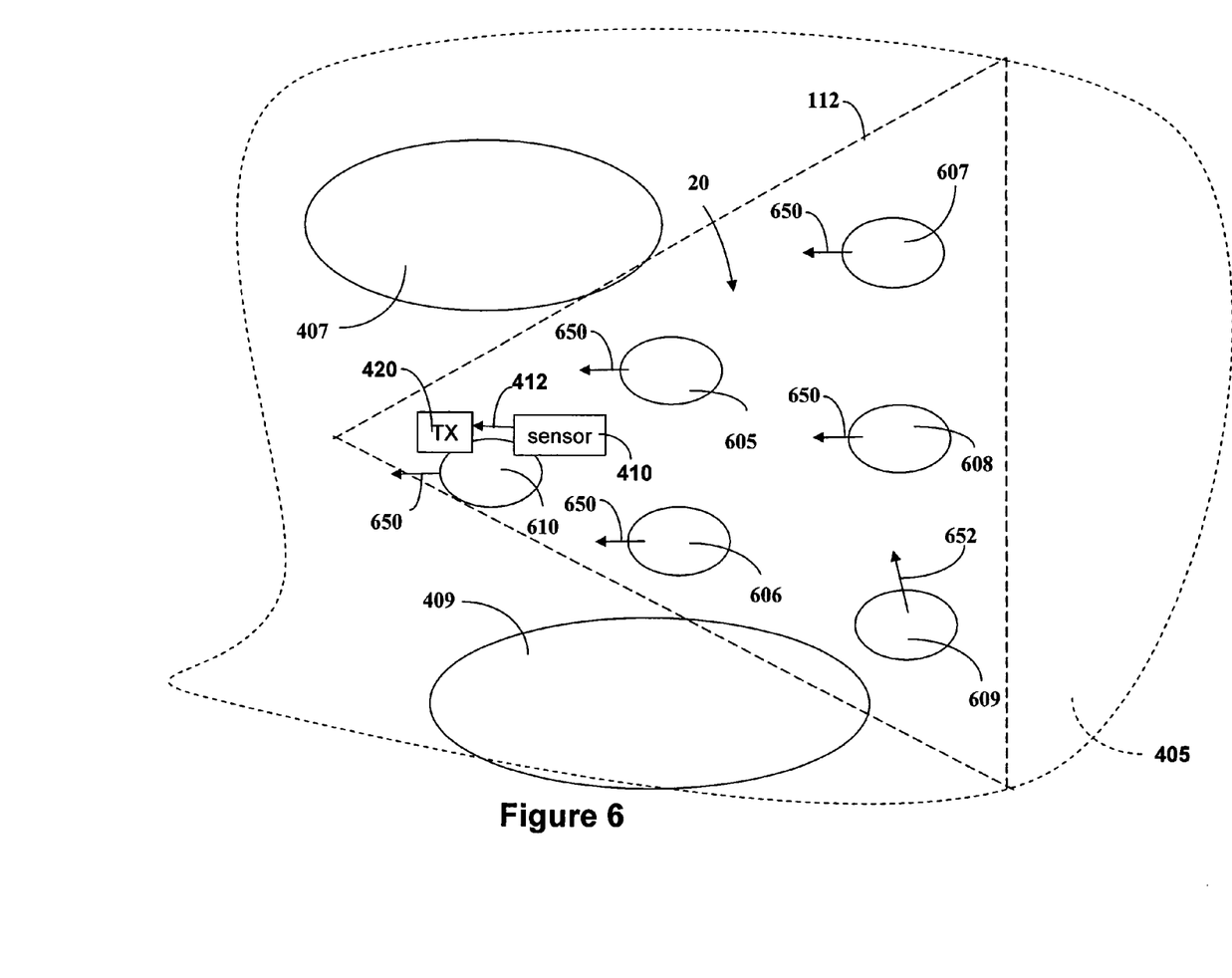
FIG. 6 is a box diagram of a local dynamical system and other dynamical systems in an exemplary environment.

FIG. 6 is a box diagram of a local autonomous system 610 (FIG. 3) and other autonomous systems 605-609 (FIG. 3) in an exemplary environment 405. Local autonomous system 610 and other autonomous systems 605-609 operate within system 20 described above with reference to FIG. 3. The environment 405 includes objects 407 and 409. The autonomous systems 605-610 are flying a formation 112 which is approximately outlined by a triangular dashed line. Local autonomous system 610 is in the front of the formation 112.

A sensor 410 and a transmitter 420 are located on an outer surface of autonomous system 610. The sensor 410 transmits data signals associated with the sensing to the transmitter 420 via transmission path 412. The transmission path is a conductive lead line. In one embodiment, the transmission path 412 is a wireless transmission path. In another embodiment, the transmission path 412 is an optical transmission path.

The sensor 410 senses one or more states of the environment 405 and transmits a data signal 412 to the transmitter 420 indicative of the sensed environment state. The transmitter 420 transmits the external environment input 450 to the information coordination level 300 as described above with reference to FIG. 3. In one embodiment, the transmitter 420 is a wireless transmitter and the information coordination level 300 includes a compatible wireless receiver to receive the wireless signal of the external environment input 450.

In another embodiment, there are a plurality of sensors 410 and transmitters 420 located in the environment 400. In yet another embodiment, one or more sensors 410 and one or more transmitters 420 are located on an external surface of one or more of the autonomous systems 605-610.

As described with reference to FIG. 5, the autonomous system 610 includes a local dynamical system 110, a local information exchanger 310 and a local intelligence system 210. The local information exchanger 310 (FIG. 5) receives other-system state input 160 from the autonomous systems 605, 606, 607, 608 and 609. The local information exchanger 310 transmits the state input 350 to the local intelligence system 210.

Likewise, dynamical system 608 includes a local dynamical system, a local information exchanger and a local intelligence system. The local information exchanger in autonomous systems 608 receives other-system state input from the autonomous systems 605, 606, 607, 609 and 610. The local information exchanger for autonomous system 608 transmits the state input for autonomous systems 608 to the local intelligence system of autonomous system 608. Thus, the dynamical system 610 is one of the other dynamical systems to the dynamical system 608.

The autonomous systems 605-608 and 610 have state vectors 650 and the autonomous system 609 has a state vector 652. In this exemplary embodiment, the state vectors 650 and 652 are selected to be the velocities of the autonomous systems 605-610. Thus, the autonomous systems 605-608 and 610 are moving in a direction parallel to the arrow representing state vector 650. In this case, the commands from the local intelligence system take the form of velocity commands along relevant axes of the system.

The multiple dynamical systems 605-610 of system 20 share the higher level preset control objectives of using waypoint following to a preset location while flying in formation 112. The preset control objectives shared by all the dynamical systems 605-610 are higher level control objectives. The unshared preset control objectives are lower level control objectives.

As described above with reference to FIG. 5, the intelligence systems 205-210 in the distributed soft computing level 200 of system 20 apply weights to the higher level preset control objectives and the lower level control objectives to form a command signal for each respective dynamical system based on the weighted control objectives. The intelligence systems 205-210 in the distributed soft computing level 200 of system 20 transmit the command signals to the local dynamical systems 105-110.

Each dynamical system 105-110 of respective autonomous systems 605-610 has many internal control objectives. In some cases, the control objectives of the dynamical systems 105-110 conflict with each other. In other cases, at least one dynamical system 105-110 has internally conflicting control objectives. In other cases, the control objectives of the dynamical systems 105-110 conflict with each other and at least one of the dynamical systems 105-110 has internally conflicting control objectives.

The formation 112 comprising autonomous systems 605-610 located in environment 405 is shown in an exemplary situation in which conflicting control objectives are resolved by the system 20 in a manner that reduces hard discrete control law switching. Specifically, system 20 is shown in FIG. 6 just after the sensors (not shown) in autonomous system 609 sensed an impending collision with object 409. One control objective of the autonomous system 609 is to avoid colliding with objects. Another control objective of the autonomous system 609 is to maintain position in the formation 112. Once autonomous system 609 sensed that object 409 was its trajectory, these control objectives were conflicting. However, in response to the sensed impending collision with object 409, the soft computing based supervisor 212 in the autonomous system 609 gave a large weight to the control objective to "avoid collision" and a small weight to the control objective to "maintain position in the formation 112." The autonomous system 609 was instructed in a command signal 250 to modify the state of the autonomous system 609 to have a new state vector 652.

The control objective to avoid a collision become priority over maintaining formation 112 and the autonomous system 609 translated upward out of the formation 112 and in a direction away from the object 409. Thus, the dynamical system 609 is shown with a state vector 652 and is moving in the direction parallel to the arrow representing state vector 652. The dynamical system 609 did not experience hard discrete control law switching between the command to "avoid collision" and the command "maintain formation." After the dynamical system 609 has cleared the object 409 the command signal 250 to maintain formation 112 will have priority and the dynamical system 609 returns to the formation 112.

Since the autonomous dynamical systems 605-610 flying in formation 112 are located in the supervisory system 20 of FIG. 3, the change in the state vector for velocity of autonomous system 609 is known by all the other autonomous systems 605-608, and 610 in the environment 405 as described above with reference to FIG. 5. When autonomous system 609 has new state vector 652, the neighboring autonomous system 608 has enough information about the state of the autonomous system 609 to determine if the autonomous system 609 is flying in a vertical direction out of the formation 112 quickly enough to avoid a collision with autonomous system 608. If necessary, the autonomous system 608 receives appropriate instructions to translate down out of the formation 112 to ensure that the autonomous system 609 does not collide with it.

Neither the autonomous system 608 nor the autonomous system 609 receives instructions in which they switch back and forth between two modes. Rather, there is a smooth change in the sizes of weights associated with specific maneuvers to ensure that they are done in a timely and stable manner. In all cases, hard discrete control law switching is avoided.

Figure 7:
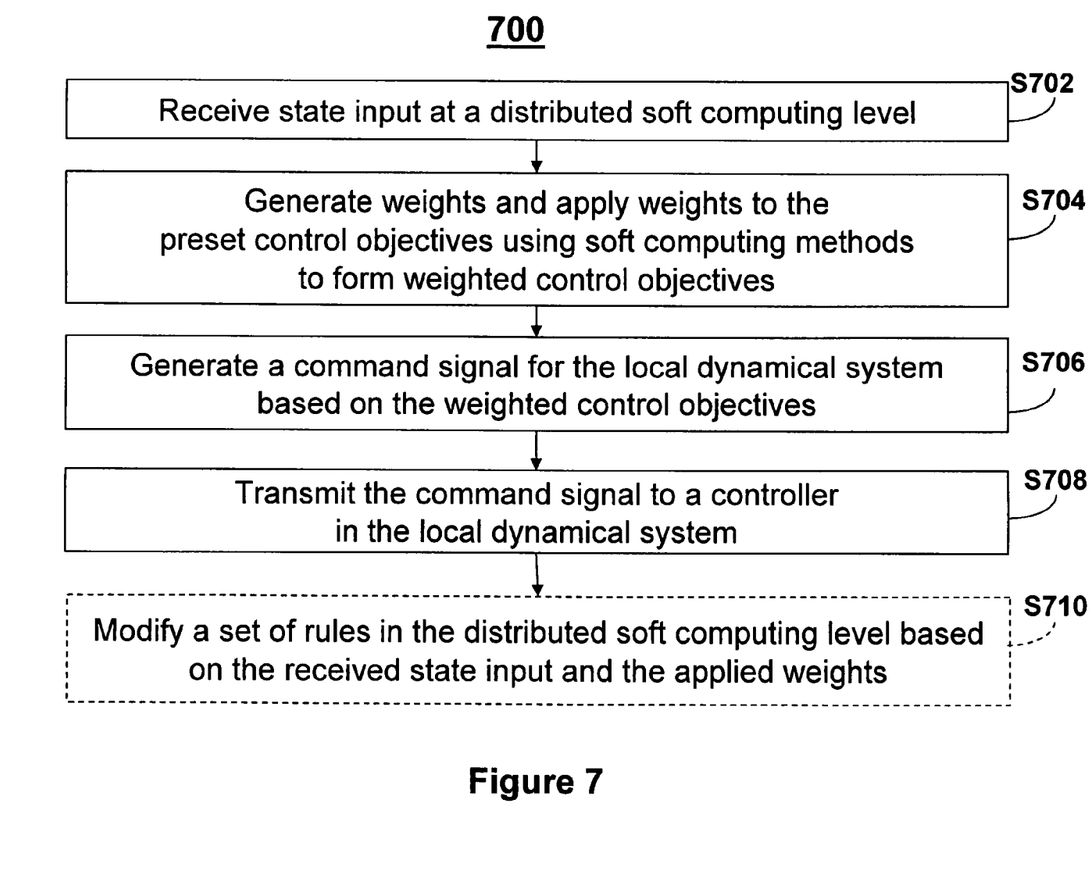
FIG. 7 is a method of supervising a local dynamical system in accordance with an embodiment of the present invention.

FIG. 7 is a method 700 of supervising a local dynamical system 110 in accordance with an embodiment of the present invention. Method 700 describes how a distributed intelligence system 202 supervises a local dynamical system 110 having multiple preset control objectives and operating in conjunction with other dynamical systems 105, 107, 109. The dynamical systems in the dynamical system level 100, the information exchangers in the information coordination level 200 and the intelligence systems in the distributed soft computing level 200 have computer readable medium storing one or more computer programs that are operable to perform the functions described herein. The method 700 is described with reference to system 20 of FIG. 3 and with reference to the local autonomous system 610 of FIG. 6. The input signals described in this method 700 are transmitted via wireless communication systems, optical communication systems, electrical circuits or combinations thereof as known in the art.

During stage S702, the distributed soft computing level 200 receives state input 350. Specifically, the state input 350 is received at the local intelligence system 210 (FIG. 3) of the local autonomous system 610 from the information coordination level 300. In one embodiment, the state input 350 comes from the dynamical system level 100. The state input 350 includes data defining the state of the local autonomous system 610, the environment 400 of the local autonomous system 610 and the state of other dynamical systems 605 up to 607 in the environment 400 of the local autonomous system 610.

During stage S704, the distributed soft computing level 200 generates weights and applies the weights to preset control objectives 221-223 (FIG. 5) using soft computing methods to form weighted control objectives. The soft computing based supervisor 212 in the local intelligence system 210 uses soft computing methods to perform intelligent reasoning and inference on the received state input 350. In one embodiment, hard computing methods are also applied to the state input 350. An exemplary soft computing method is described below with reference to FIG. 9.

During stage S706, the distributed soft computing level 200 generates a command signal 250 based on the weighted control objectives 221-223 for the local dynamical system 110. The mixing system 230 (FIG. 5) mixes the weights from the soft computing based supervisor 212 with the preset control objectives 221-223 that are stored in the memory 220 and sends the mixed output to a summation processor 240 (FIG. 5) in the local intelligence system 210.

During stage S708, the distributed soft computing level 200 transmits the command signal 250 to a controller 120 in the local dynamical system 110. The command signal 250 is a target value for a selected state of the local dynamical system 110.

Stage S710 is optional and performed as needed. During stage S710, the distributed soft computing level 200 modifies the reasoning/inference system (e.g. a set of rules) in the distributed soft computing level 200 based on the receiving of the state input 350 and application of weights on preset control objectives 221-223 to form weighted control objectives.

The soft computing based supervisor 212 uses soft computing that has the capability to modify a reasoning/inference system if the reasoning/inference system is determined to be faulty, redundant, useless or inadequate. Over time, as the soft computing based supervisor 212 receives state input 350 and applies weights to the preset control objectives 221-223, the soft computing based supervisor 212 recognizes when a reasoning/inference system is faulty, redundant, useless or inadequate.

Figure 8:
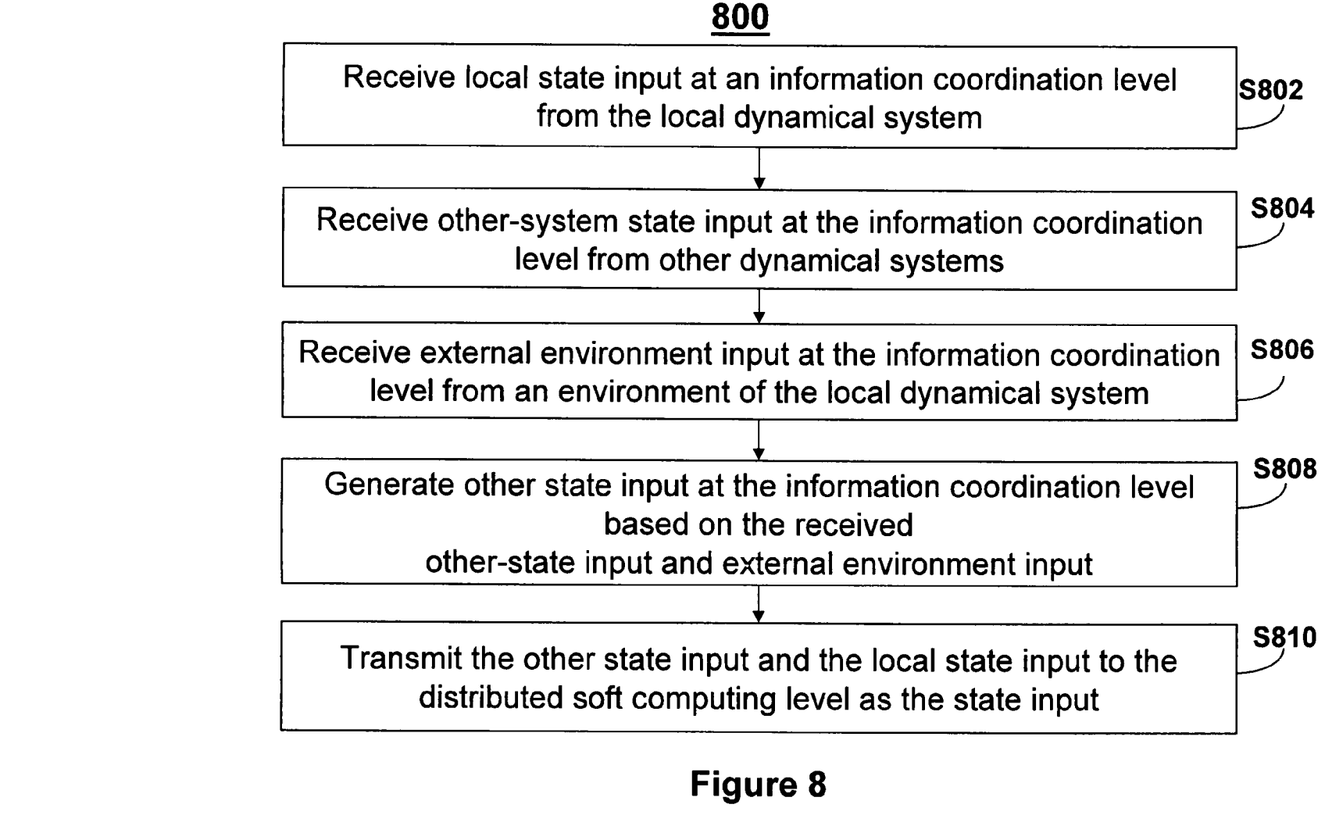
FIG. 8 is a method of receiving state input in accordance with an embodiment of the present invention.

FIG. 8 is a method 800 of receiving state input 350 in accordance with an embodiment of the present invention. Method 800 describes how a local information exchanger 310 in the information coordination level 300 of the system 20 receives input from the environment, the local dynamical system 110 and other dynamical systems 105-107 and forms a state input 350. The dynamical systems in the dynamical system level 100, the information exchangers in the information coordination level 200 and the intelligence systems in the distributed soft computing level 200 have computer readable medium storing at least one computer program that is operable to perform the functions described herein. The method 800 is described with reference to system 20 of FIG. 3 and with reference to the local autonomous system 610 of FIG. 5. The input signals described in method 800 are transmitted via wireless communication systems, optical communication systems, electrical circuits or combinations thereof as known in the art.

During stage S802, the local information exchanger 310 receives local state input 150 at the information coordination level 300 from the local dynamical system 110.

During stage S804, the local information exchanger 310 receives other-system state input 160 at the information coordination level 400 from other dynamical systems 105 and 107. The other dynamical systems 105 and 107 share environment 400 with the local dynamical system 110 and have their own state inputs.

During stage S806, the local information exchanger 310 receives external environment input 450 at the information coordination level 300 from an environment 400 of the local dynamical system 110. The external environment input 450 was sensed by sensor 410 (FIG. 6) in the environment 400 and transmitted from a transceiver 420 (FIG. 6) in operation with the sensor 410 or directly from the sensor 410. In one embodiment, the sensor is a plurality of sensors. The external environment input 450 includes input about the temperature, humidity, and wind speed in the environment 400.

During stage S808, the local information exchanger 310 generates the other state input 170 at the information coordination level 300 based on the received the other-system state input 160 and the external environment input 450. The local information exchanger 310 combines the received the other-system state input 160 and the external environment input 450.

During stage S810, the local information exchanger 310 transmits the other state input 170 and the local state input 150 to the distributed soft computing level 200 as the state input 350. The local information exchanger 310 combines state input 170 and the local state input 150 to form the state input 350.

Figure 9:
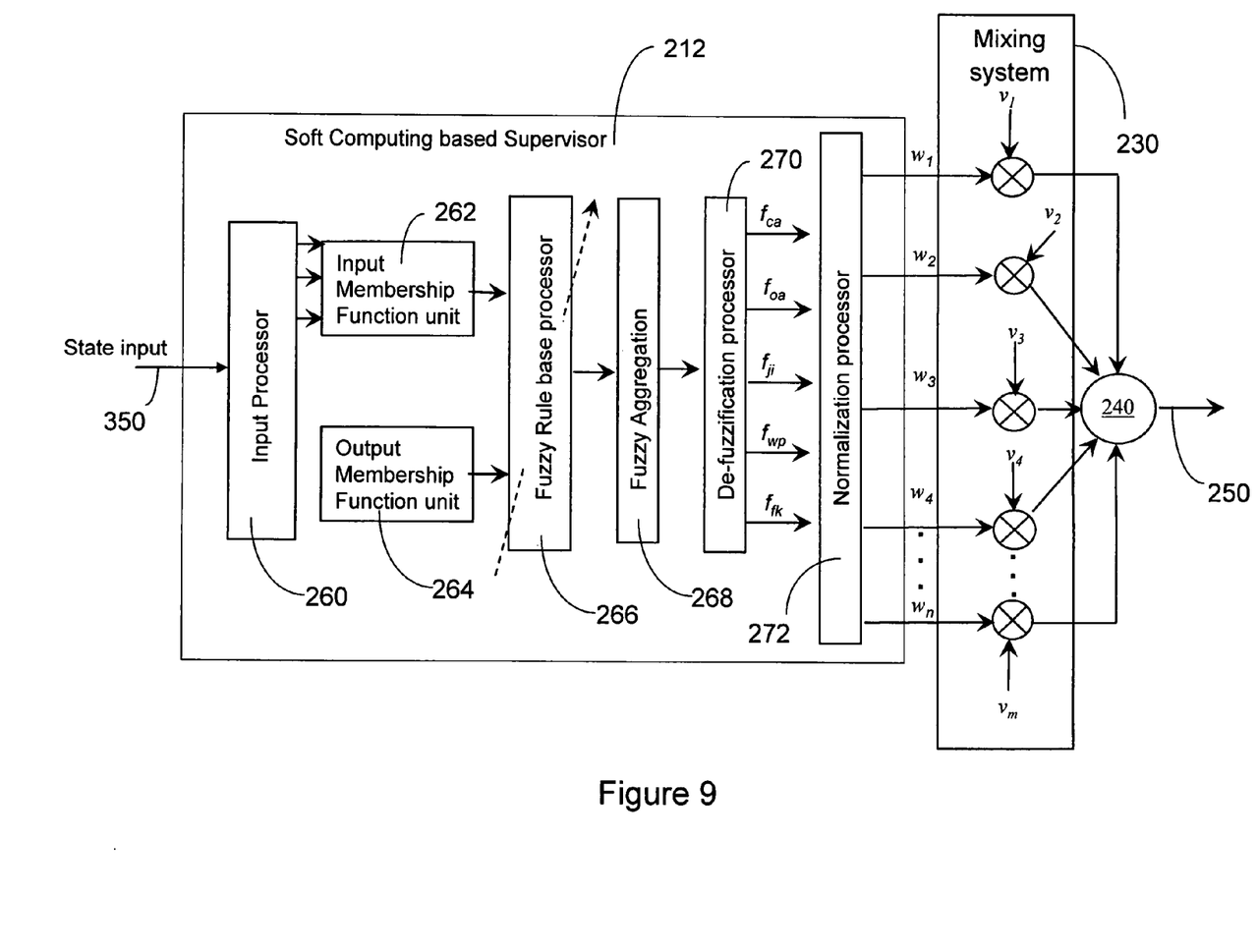
FIG. 9 is a box diagram of an embodiment of a soft-computing supervisor in accordance with the present invention.

FIG. 9 is a box diagram of an embodiment of a soft-computing based supervisor 212 in accordance with the present invention. This embodiment illustrates an implementation of fuzzy inference. The state input 350 is received at the input processor 260 as a string of data. The input processor 260 maps the input data string to linguistic variables and outputs the linguistic variables to the input membership function unit 262. The linguistic variables indicate collision-possibility of the closest vehicle, obstacle-visibility of the nearest object and formation-metric of the vehicle to indicate how well the dynamical system is maintaining the formation. In one embodiment, the label include "high," "medium," "low" "good," fair," and "poor."

The input membership function unit 262 determines where the linguistic variables belong and transmits an output to the fuzzy rule base processor 266. The output membership function unit 264 describes the extent to which the outcome from fuzzy inference belongs to each of the specified control objectives. The output membership function unit 264 is used in the defuzzification process to recover an appropriate raw weighting on each control objective.

Intelligent reasoning takes place in the fuzzy rule base processor 266. The fuzzy rule base processor 266 categorizes the inputs from the input membership function unit 262 and the output membership function unit 264. The fuzzy rule base processor 266 includes the rule sets. The rules are in the form of "If (antecedent), then (consequent)." An exemplary rule is "If (collision-possibility is medium) and (formation-metric is good) then (collision avoidance is medium)." In an exemplary case, there are three fuzzy antecedents, 5 consequents and 16 fuzzy rules which are each tunable by the fuzzy rule base processor 266.

After the fuzzy rule base processor 266 has determined which rules in the rule set are active, the fuzzy aggregation processor 268 operates on the rule set to obtain a resultant of all active fuzzy rules and thereby prepare the variables for defuzzification. The outcome from defuzzification are the raw numerical weighting on each control objective. The raw weights are formed based on the possibility of the control objective not being satisfied. Some of the exemplary control objectives include "collision avoidance," "obstacle avoidance," "waypoint following," and "formation maintenance" (respectively, "$f_{ca}$," "$f_{oa}$," "$f_{wp}$," "$f_{fk}$" in FIG. 9). The defuzzification processor 270 transmits the numerical data set to the normalization processor 272. The normalization processor 272 normalizes the raw weightings on each control objective and outputs a numeric weight $W_1$-$W_m$ for each control objective to the mixing system 230. The numeric weights $W_1$-$W_m$ are mixed in the mixing system 230 with the control objectives as described above with reference to FIG. 5. The control objectives are represented in FIG. 9 as arrows $v_1$ to $v_m$ within the mixing system 230. In the exemplary UAV scenario, $v_1$ to $v_m$ are command velocities required to accomplish the first control objective 221 (FIG. 5) to the $m^{th}$ control objective 332 (FIG. 5), respectively. The output of the mixing system 230 is summed by the summation processor 240 to generate the specific command signals 250 based on the weighting.

In this manner the soft computing based supervisor 212 has taken the state input 350 and generated weights $W_1$-$W_n$ using a soft computing method of fuzzy inference. Other methods of soft computing are possible.

Although specific embodiments have been described herein, it will be appreciated by those of skill in the art that other soft computing methods and system configurations for a distributed intelligence system to reduce mode switching for interacting dynamical systems are possible. This application is intended to cover any adaptations and variations of the present invention. Therefore it is manifestly intended that this invention be limited only by the claims and the equivalents thereof.

The invention claimed is:

1. A method to supervise a dynamical system having multiple preset control objectives and operating in conjunction with other dynamical systems comprising:

receiving state input from dynamical systems in an environment at a distributed soft computing level from an information exchanger at an information coordination level;

generating weights and applying the weights to the multiple preset control objectives using soft computing methods to form weighted control objectives, wherein the weights are generated based on the received state input, and wherein a priority of multiple preset control objectives is shifted as the inputs to the information exchanger change;

generating a command signal for the dynamical system based on the weighted control objectives; and transmitting the command signal to a controller in the dynamical system.

2. The method of claim 1, wherein the command signal is a target value for a selected state of the dynamical system.

3. The method of claim 1 further comprising:

modifying a reasoning/inference system in the distributed soft computing level based on the receiving state input and applying.

4. The method of claim 1, wherein receiving state input further comprises:

receiving state input regarding the dynamical system at an information coordination level from the dynamical system;

receiving other-system state input regarding the other dynamical systems at the information coordination level from other dynamical systems;

receiving external environment input at the information coordination level from an environment of the dynamical system;

generating other state input at the information coordination level based on receiving the other-system state input and the external environment input; and transmitting the other state input regarding the other dynamical systems and the state input regarding the dynamical system to the distributed soft computing level as the state input.

5. The method of claim 4, wherein the dynamical system and the other dynamical systems are on a dynamical system level at a lower level than the information coordination level.

6. The method of claim 4, wherein the information coordination level is internal to the distributed soft computing level.

7. The method of claim 1, wherein the distributed soft computing level comprises one or more soft computing methodologies including fuzzy logic, fuzzy inference schemes, neural networks, evolutionary computation schemes, neural networks with on-line training, simulated annealing schemes, genetic algorithms and randomized heuristical algorithms located in a distributed intelligence system.

8. A system comprising:

a dynamical system at a dynamical system level;

an intelligence system at a distributed soft computing level in communication with the dynamical system, wherein the distributed soft computing level is higher than the dynamical system level; and other dynamical systems at the dynamical system level in communication with respective other intelligence systems at the distributed soft computing level, wherein the intelligence system generates a command signal for the dynamical system and the respective other intelligence systems generate other command signals for the respective other dynamical systems wherein the command signal is generated based on a weighting of preset control objectives.

9. The system of claim 8, wherein the intelligence system is co-located with the dynamical system and the other intelligence systems are co-located with respective other dynamical systems, wherein the dynamical system and the other dynamical systems are autonomous dynamical systems.

10. The system of claim 8, wherein the intelligence system is remotely located from the dynamical system and the other intelligence systems are remotely located from respective other dynamical systems, wherein the dynamical system and the other dynamical systems are semi-autonomous dynamical systems.

11. The system of claim 8 further comprising:
an information exchanger at an information coordination level, the information coordination level between the dynamical system level and the distributed soft computing level, wherein the other dynamical systems communicate with the intelligence system via the information exchanger, and wherein the information coordination level includes other information exchangers.

12. The system of claim 11, wherein the intelligence system and the information exchanger are co-located with the dynamical system and other intelligence systems and respective other information exchangers are co-located with respective other dynamical systems, wherein the dynamical systems and the other dynamical systems are autonomous dynamical systems.

13. The system of claim 11, wherein the intelligence system and the information exchanger are remotely located from the dynamical system, wherein the other intelligence systems and respective other information exchangers are remotely located from respective other dynamical systems, and wherein the dynamical systems and the other dynamical systems are semi-autonomous dynamical systems.

14. The system of claim 8, wherein the intelligence system includes:
a soft computing based supervisor receiving a state input of the dynamical system;
a memory storing the preset control objectives of the dynamical system;
a mixing system to apply weights to a respective preset control objectives, wherein the weights are based on the state input; and
a summation processor to generate command signals, wherein the soft computing based supervisor modifies an initial set of intelligent reasoning algorithms based on the received state input.

15. The system of claim 8, wherein the dynamical system comprises:
a controller operable to initiate an action for the dynamical system based on the command signal;
a plant operable to be modified according to the initiated action;
sensors to sense selected states; and
a transceiver to transmit the sensed selected states and to receive the command signal.

16. The system of claim 8, wherein the other dynamical systems are similar in structure and function to the dynamical system, and wherein the dynamical system is an other dynamical system for the other dynamical systems.

17. The system of claim 8, further comprising:
an environment in which the dynamical system and the other dynamical systems are located;
environmental sensors to sense selected states of the environment; and
a transmitter to transmit the sensed environmental selected states to the intelligence system.

18. The system of claim 8, wherein the intelligence system comprises one or more soft computing methodologies including fuzzy logic, fuzzy inference schemes, neural networks, evolutionary computation schemes, neural networks with on-line training, simulated annealing schemes, genetic algorithms and randomized heuristical algorithms.

19. A computer readable medium storing a computer program, comprising:
computer readable code to receive state input from a dynamical system and other dynamical systems in an environment at a distributed soft computing level;
computer readable code to generate weights and to apply the weights to preset control objectives to form weighted control objectives, wherein the weights are generated using a soft computing methodology to determine a priority of the preset control objectives based on the received state input;
computer readable code to generate a command signal for a dynamical system based on the determined priority of the preset control objectives; and
computer readable code to transmit the command signal from the distributed soft computing level to the dynamical system.

20. The medium of claim 19, further comprising:
computer readable code to modify a reasoning/inference system in the distributed soft computing level.

* * * * *